(12) United States Patent
Thomas et al.

(10) Patent No.: US 9,180,956 B1
(45) Date of Patent: Nov. 10, 2015

(54) METHODS AND APPARATUS FOR ATTACHING AN AIRCRAFT WING ASSEMBLY TO AN AIRCRAFT BODY

(75) Inventors: Grant Brian Thomas, Lake Stevens, WA (US); Chun-Liang Lin, Bellevue, WA (US); Francis E. Andrews, Everett, WA (US)

(73) Assignee: The Boeing Company, Chicago, IL (US)

(*) Notice: Subject to any disclaimer, the term of this patent is extended or adjusted under 35 U.S.C. 154(b) by 277 days.

(21) Appl. No.: 13/444,441

(22) Filed: Apr. 11, 2012

(51) Int. Cl.
*B64C 1/06* (2006.01)

(52) U.S. Cl.
CPC ........................................ *B64C 1/06* (2013.01)

(58) Field of Classification Search
USPC ........................................ 244/131, 119, 123.7
See application file for complete search history.

(56) References Cited

U.S. PATENT DOCUMENTS

| | | | |
|---|---|---|---|
| 1,865,964 A | 7/1932 | Rohrbach | |
| 2,001,260 A | 5/1935 | Martin | |
| 2,211,089 A | 8/1940 | Berlin | |
| 2,370,801 A * | 3/1945 | Klose | 244/13 |
| 2,412,778 A | 12/1946 | Kosek | |
| 2,749,061 A | 6/1956 | Franz | |
| 2,779,558 A | 1/1957 | Hereil et al. | |
| 3,018,985 A | 1/1962 | Voigt | |
| 4,390,153 A | 6/1983 | Wuermseer | |
| 4,417,708 A | 11/1983 | Negri | |
| 4,893,964 A | 1/1990 | Anderson | |
| 5,806,797 A * | 9/1998 | Micale | 244/120 |
| 6,808,143 B2 * | 10/2004 | Munk et al. | 244/123.1 |
| 6,843,450 B2 * | 1/2005 | Bath et al. | 244/131 |
| 7,182,293 B2 * | 2/2007 | Sarh | 244/123.7 |
| 7,195,418 B2 | 3/2007 | Durand et al. | |
| 7,501,814 B2 | 3/2009 | Thwing et al. | |
| 7,546,979 B1 * | 6/2009 | Estell et al. | 244/123.1 |
| 7,721,992 B2 | 5/2010 | Keeler et al. | |
| 7,887,009 B2 * | 2/2011 | Keeler et al. | 244/131 |
| 7,909,290 B2 * | 3/2011 | Cooper | 244/132 |
| 7,975,965 B2 * | 7/2011 | Ackermann et al. | 244/124 |
| 8,016,236 B2 | 9/2011 | Grieve et al. | |
| 8,061,655 B1 | 11/2011 | Manley et al. | |
| 8,142,126 B2 * | 3/2012 | Porter et al. | 411/389 |
| 8,146,242 B2 | 4/2012 | Prichard et al. | |
| 8,286,911 B2 | 10/2012 | McAlinden et al. | |
| 8,371,532 B2 * | 2/2013 | Williams et al. | 244/131 |
| 8,408,495 B2 | 4/2013 | Cortes et al. | |
| 8,573,539 B2 | 11/2013 | Honorato Ruiz | |

(Continued)

OTHER PUBLICATIONS

Notice of Allowance in U.S. Appl. No. 13/652,975 dated Apr. 11, 2014.

*Primary Examiner* — Brian M O'Hara
*Assistant Examiner* — Keith L Dixon
(74) *Attorney, Agent, or Firm* — Baldauff IP, LLC; Michael J. Baldauff, Jr.

(57) ABSTRACT

The present disclosure is generally directed to an aircraft including an aircraft body having a number of body frame members on an outboard portion of the aircraft body, a wing assembly extending through a portion of the aircraft body. At least one pair of an attachment member and an attachment strap member are fixedly attached to an upper surface of the wing assembly proximate the portion of the aircraft body at a location of one of the number of body frame members. A number of fasteners fixedly attach the aircraft body via at least one body frame member to one attachment member and a corresponding attachment strap member, thereby securing the aircraft body to the wing assembly.

6 Claims, 9 Drawing Sheets

(56) References Cited

U.S. PATENT DOCUMENTS

| | | |
|---|---|---|
| 2006/0018710 A1 | 1/2006 | Durand et al. |
| 2007/0095982 A1 | 5/2007 | Kismarton et al. |
| 2008/0283666 A1 | 11/2008 | Grieve et al. |
| 2009/0065644 A1 | 3/2009 | Jacques |
| 2009/0146007 A1 | 6/2009 | Keeler et al. |
| 2009/0283637 A1 | 11/2009 | Nolia |
| 2010/0200691 A1 | 8/2010 | Galiant |
| 2011/0147521 A1 | 6/2011 | Delahaye et al. |
| 2012/0193475 A1 | 8/2012 | Cabanac et al. |
| 2012/0241560 A1 | 9/2012 | Erickson |
| 2012/0286090 A1 | 11/2012 | Guittard et al. |
| 2012/0286091 A1 | 11/2012 | Kajita et al. |
| 2013/0020440 A1 | 1/2013 | Honorato Ruiz |
| 2013/0032670 A1 | 2/2013 | Endres et al. |
| 2013/0062467 A1 | 3/2013 | Soenarjo |
| 2013/0175395 A1 | 7/2013 | Lucas et al. |

\* cited by examiner

METHODS AND APPARATUS FOR ATTACHING AN AIRCRAFT WING ASSEMBLY TO AN AIRCRAFT BODY

TECHNICAL FIELD

The following disclosure relates generally to aircraft structures and, more particularly, to aircraft wing-to-body attachments.

BACKGROUND

A significant portion of aircraft final assembly time is spent in joining the wing assembly to the aircraft body. Conventional wing-to-body installation attaches frame stub beams to fasteners used to splice the outboard wing box to the center wing box as well as to a vertical flange connecting the aircraft body skin to the wing box. The interface to the wing box includes both body stub beams and the wing box stringer details and fastener patterns. The aircraft body side panel frames are split in two to allow a lower frame segment to become a loose integration piece at the wing to body integration position. This configuration results in added frame weight due to the aircraft body frame splice. Also, the secondary fuel barrier application process contains hazardous fumes, and cannot be fully completed until after this installation is complete. This places an expensive and complex process in the wing to body integration location.

As the foregoing discussion suggests, current methods of joining wings to bodies in aircraft can be both time-consuming and costly, with the added downside that the additional body weight from the numerous fastening systems reduces aircraft performance and fuel efficiency. Accordingly, new methods and systems for joining aircraft wings to bodies that require less time and less structural reinforcement would be desirable. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, an aircraft includes an aircraft body having a number of body frame members on an outboard portion of the aircraft body, a wing assembly extending through a portion of the aircraft body. At least one pair of an attachment rail member and an attachment strap member are fixedly attached to an upper surface of the wing assembly proximate the portion of the aircraft body at a location of one of the number of body frame members. A number of fasteners fixedly attach the aircraft body via at least one body frame member to one attachment rail member and a corresponding attachment strap member, thereby securing the aircraft body to the wing assembly.

In another embodiment disclosed herein, an attachment apparatus for an aircraft includes an air craft aircraft body having a number of aircraft body frame members on an outboard portion of the aircraft body, and a wing assembly extending through a portion of the aircraft body. The attachment apparatus includes at least one pair of an attachment rail member and an attachment strap member fixedly attached to an upper surface of the wing assembly proximate the portion of the aircraft body at a location of one of the number of body frame members. The attachment rail member includes an upwardly extending projection for receiving the outboard portion of the aircraft body. A number of fasteners fixedly attach the aircraft body, via at least one body frame member, to one attachment rail member and a corresponding attachment strap member, thereby securing the aircraft body to the wing assembly. The attachment rail member includes an outboard projection disposed where at least one fastener secures the aircraft body to the wing assembly. The outboard projection may be a thickness greater than a surrounding thickness of the upwardly extending projection.

In another embodiment disclosed herein, a method of assembling an aircraft includes constructing a wing assembly and an aircraft body having a number of body frame members to be connected to an upper surface of the wing assembly. A number of pairs of rails and strap brackets are attached to the upper surface of the wing assembly and the aircraft body is aligned via the number of body frame members to each of the number of pairs of rails and strap brackets. The aircraft body is fastened with fasteners via each body frame member to a corresponding pair of rails and strap brackets, where the fasteners are oriented in a direction parallel to the upper surface of the wing assembly.

Aircraft body frame connection to the upper wing box surface is de-coupled from the common interface with the wing fuel cell and only attaches to the wing box through vertical interfaces outside the wing box. This configuration allows the wing fuel cell to be completed prior to joining it to the aircraft body. The configuration also allows the aircraft body frames to be fully installed to the aircraft body skin prior to joining to the wing. Moreover, this configuration results in less manufacturing cycle time at the wing to body join position.

The features, functions, and advantages that have been discussed can be achieved independently in various embodiments of the present disclosure or may be combined in yet other embodiments, further details of which can be seen with reference to the following description and drawings.

DETAILED DESCRIPTION

The following disclosure describes various methods and systems for attaching aircraft wings to aircraft bodies in an efficient manner. As described in greater detail below, in one embodiment an aircraft wing may be attached to an aircraft body by fasteners that allow the aircraft body to be attached to the wing assembly without any fastening devices penetrating the wing assembly. Certain details are set forth in the following description and in FIGS. 1-8 to provide a thorough understanding of various embodiments described herein. However, other details describing well-known structures and systems often associated aircraft wings, body and aircraft structures in general are not set forth below to avoid unnecessarily obscuring the description of various embodiments described herein.

Many of the details, dimensions, angles and other features shown in the Figures are merely illustrative of particular embodiments described herein. Accordingly, other embodiments can have other details, dimensions, angles and features without departing from the spirit or scope of the embodiments described herein. In addition, those of ordinary skill in the art will appreciate that further embodiments can be practiced without several of the details described below. Additionally, identical reference numbers in the Figures identify identical or at least generally similar elements. The features, functions, and advantages that have been discussed can be achieved independently in various embodiments of the present disclosure or may be combined in yet other embodiments, further details of which can be seen with reference to the following description and drawings.

Figure 1:
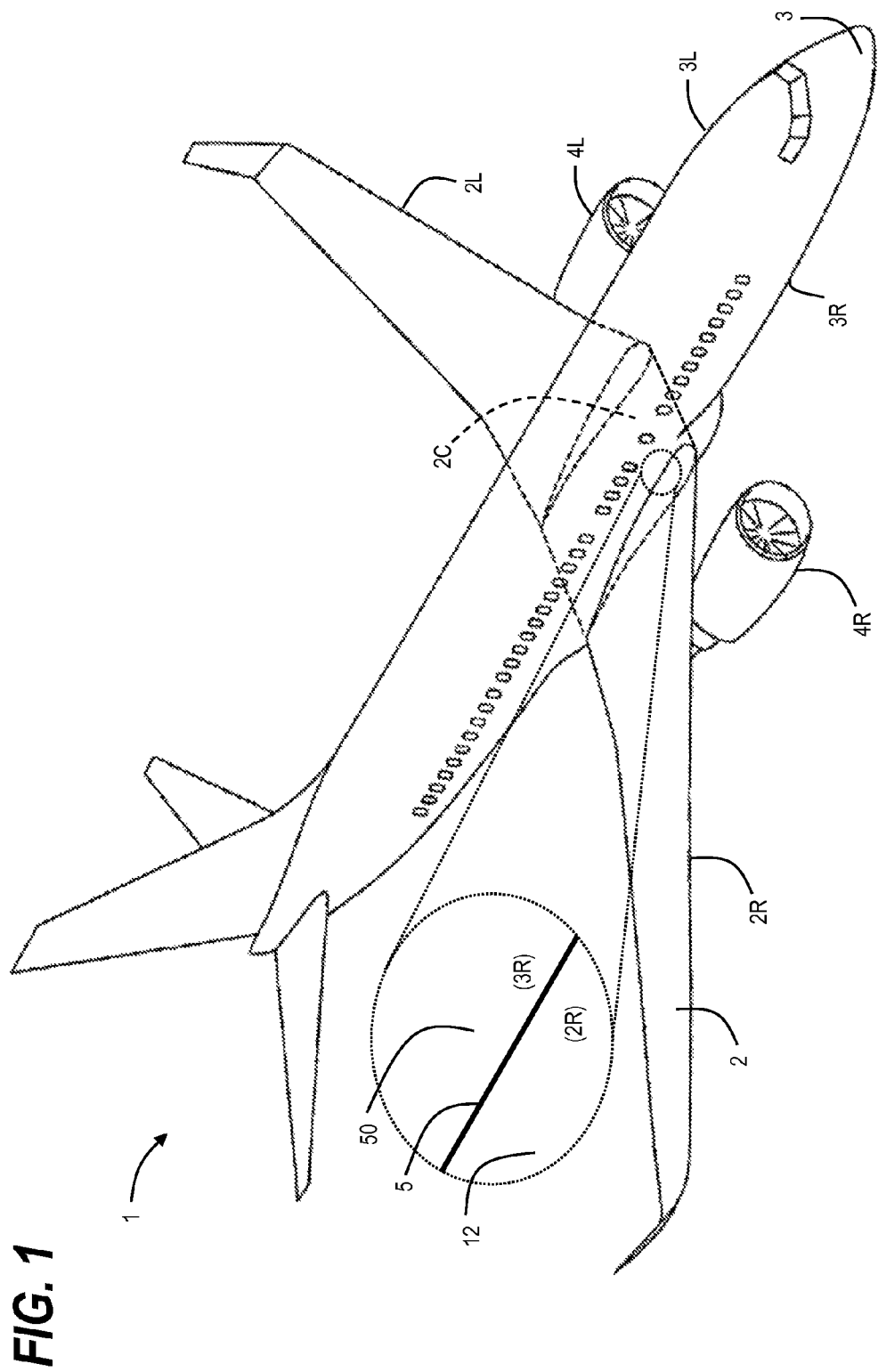
FIG. 1 is a top isometric view of an aircraft having a wing member joined to an aircraft body in accordance with an embodiment disclosed herein.

FIG. 1 is a top isometric view of an aircraft 1 having a wing assembly 2 attached to an aircraft body 3 in accordance with an embodiment presented herein. The aircraft body 3 includes a right aircraft body portion 3R and a corresponding left aircraft body portion 3L. The wing assembly 2 includes a right wing assembly portion 2R extending outwardly from the right aircraft body portion 3R, and a left wing assembly portion 2L extending outwardly from the left aircraft body portion 3L. The wing assembly 2 further includes a wing box center section 2C extending through at least a portion of the aircraft body 3. The wing box center section 2C structurally attaches the right wing assembly portion 2R to the left wing assembly portion 2L. Wing assembly portions 2R and 2L are joined to the aircraft body portions 3R and 3L, respectively, at an adjoining intersection 5, where an outer wing skin 12 of the wing assembly 2 intersects an outer body skin 50 of the aircraft body 3. The embodiments presented herein are novel methods and systems for adjoining the aircraft body 3 to the wing assembly 2 along this adjoining section 5, in the proximate location where the outer body skin 50 meets the outer wing skin 12.

In the illustrated embodiment, the aircraft 1 is a commercial aircraft having a first engine 4R carried by the right wing assembly portion 2R, and a second engine 4L carried by the left wing assembly portion 2L. In other embodiments, however, the methods and systems described herein for attaching wings to bodies can be used on other aircraft, includes other commercial and non-commercial aircraft. For example, other transport aircraft having one or more engines mounted to the aircraft body.

Figure 2:
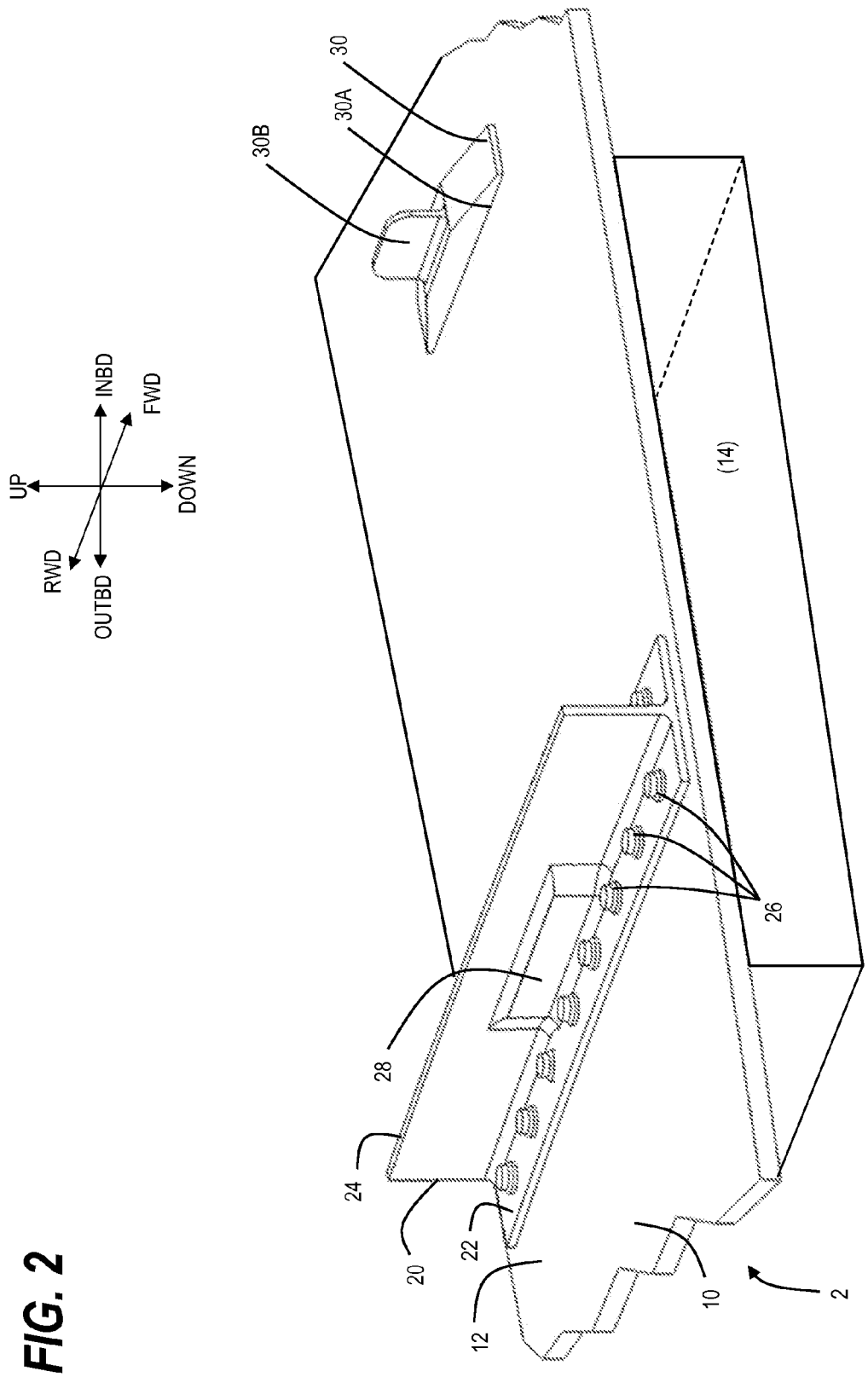
FIG. 2 is an enlarged, partially cutaway isometric view illustrating the wing member with a pair of attachment rail members to receive an aircraft body.

FIG. 2 is an enlarged, partially cutaway isometric view illustrating a wing assembly 2 with a pair of corresponding attachment members, (attachment rail 20 and strap attachment fitting 30), adapted to receive an aircraft body structure 3. FIG. 2 illustrates the wing assembly 2 includes an upper wing assembly portion 10 having an outer wing skin 12, and an interior cavity structure 14 that may be completely located within the wing assembly 2. The interior cavity structure 14 may include a fuel cell or any other cavity that is independent from the aircraft body 3. For example, the interior cavity structure 14 may be pressure tested independently from body pressure testing.

An attachment rail 20, proximate to and disposed in the same direction as adjoining intersection 5 in FIG. 1, is attached to the outer wing skin 12 along a laterally oriented web portion 22 of the attachment rail 20 with a number of vertically oriented fasteners 26. A vertical projection 24 of the attachment rail 20 extends in an orthogonal direction to the planar surface of the outer wing skin 12 and the web portion 22 for receiving an aircraft body 3 structure member described below. Along one outboard side of the vertical projection is an outboard projection 28 that begins at the intersection of the web portion 22 and the vertical portion 24 and extends in an upward direction toward a midsection of the vertical portion. The outboard projection may increase the thickness of material in the vertical portion 24 up to twice or more the nominal thickness of the surrounding vertical portion 24.

A strap attachment fitting 30 disposed in an inboard direction from the attachment rail 20, and directly opposite the outboard projection 28, is attached via a base 30A to the outer wing skin 12 either by fasteners, (not shown), or by other equivalent bonding means. An attachment plate 30B is mounted on an upper portion of the strap attachment fitting 30 such that an outboard facing surface of the attachment plate 30B is aligned with and faces the outboard projection 28 of the attachment rail 20.

The wing assembly 2 in FIGS. 2-6 illustrates a wing embodiment where the outer wing skin 12 is contiguous at least over a portion of the outer wing skin 12 where the attachment rail 20 and strap attachment fitting 30 are disposed. However, other embodiments presented herein, (see FIG. 7), demonstrate multiple piece wing skins and wing sections allowing for variations in wing assembly design to be joined to the attachment rail 20 and strap attachment fitting 30. The proposed design is applicable for a traditional 3-piece wing, a 2-piece wing, as well as tip-to-tip 1-piece wing designs.

In the configuration as illustrated in FIG. 2, after the attachment rail 20 has been joined with the vertically oriented fasteners 26 through the outer wing skin 12 and the strap attachment fitting has been attached to the outer wing skin 12, the interior cavity structure 14 may be pressure tested to check for leakage before any body structure is attached to the wing assembly 2. This allows the wing box center section 2C to be complete with any internal cavities to be pressure tested and service ready as desired prior to joining with the aircraft body 3.

Figure 3:
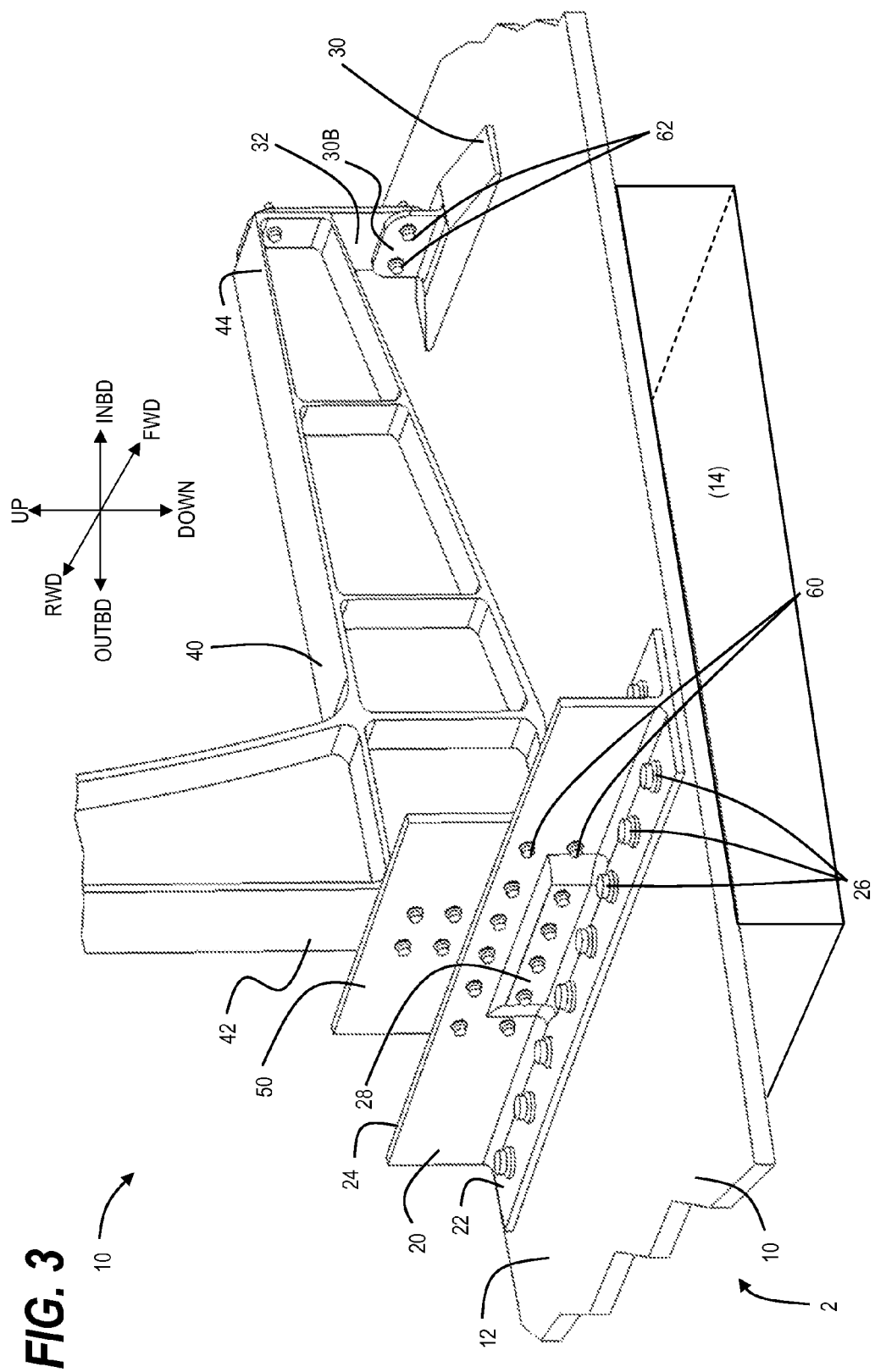
FIG. 3 is an enlarged, rearward inboard viewing, partially cutaway isometric view illustrating the wing member and the pair of attachment rail members being joined to a body frame member.

FIG. 3 is an enlarged, rearward inboard viewing, partially cutaway isometric view illustrating the wing assembly 2 and the pair of attachment members (20, 30) being joined to a body frame member 40. Body frame member 40 is provided with an outboard side 42 and an inboard side 44. An outer body skin 50 is attached to the outboard side 42 of the aircraft body frame member 40, and a tension strap 32 is attached to the inboard side 44 of the aircraft body frame member 40 and attached with fasteners 62 via the attachment plate 30B to the strap attachment fitting 30. Fasteners 60 are attached to the vertical projection 24 of the attachment rail 20, the outer body skin 50 and the outboard side 42 of the aircraft body frame member 40. Additionally, at least some of the fasteners 60 are attached through the outboard projection 28 portion of the vertical projection 24 of the attachment rail. The outboard projection portion 28 increases the stiffness and rigidity of the attachment rail 20 when attached to the aircraft body frame member 40 under loading conditions.

Fasteners 60 and 62 used to connect the aircraft body 3 to the wing assembly 2 are oriented in a direction parallel to the surface of the outer wing skin 12 and therefore never penetrate the surface of the outer wing skin 12 to compromise any internal structures (like interior cavity structure 14) within the wing assembly 2. This allows for all testing to be performed on the wing assembly 2 before joining to the aircraft body 3 without a need to retest for any compromise to any interior cavity structures (e.g., 14) due to fasteners potentially piercing the internal wing assembly structures.

Figure 4:
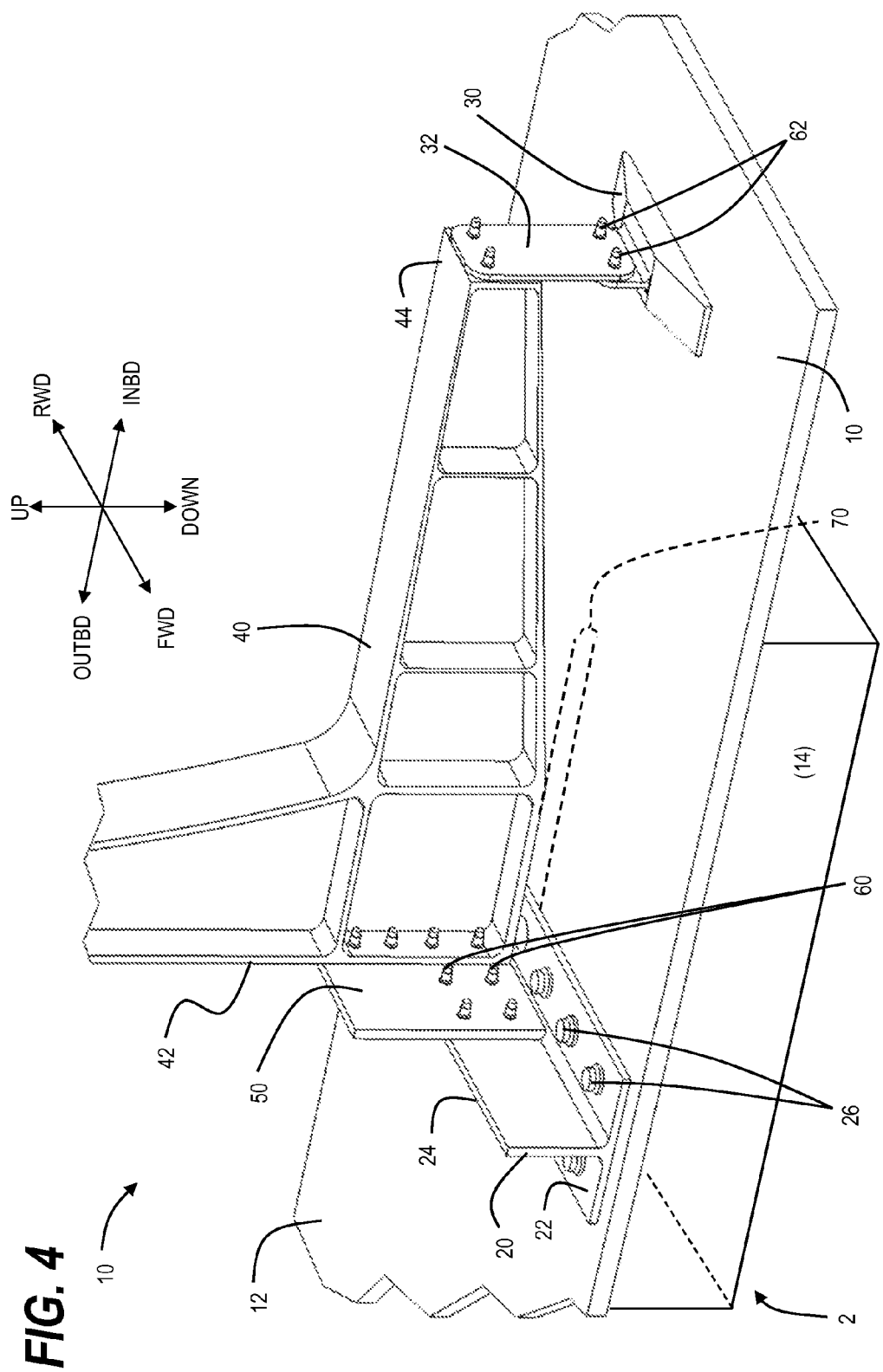
FIG. 4 is an enlarged, rearward outboard viewing, partially cutaway isometric view illustrating the wing member and the pair of attachment rail members being joined to a body frame member.
Figure 5:
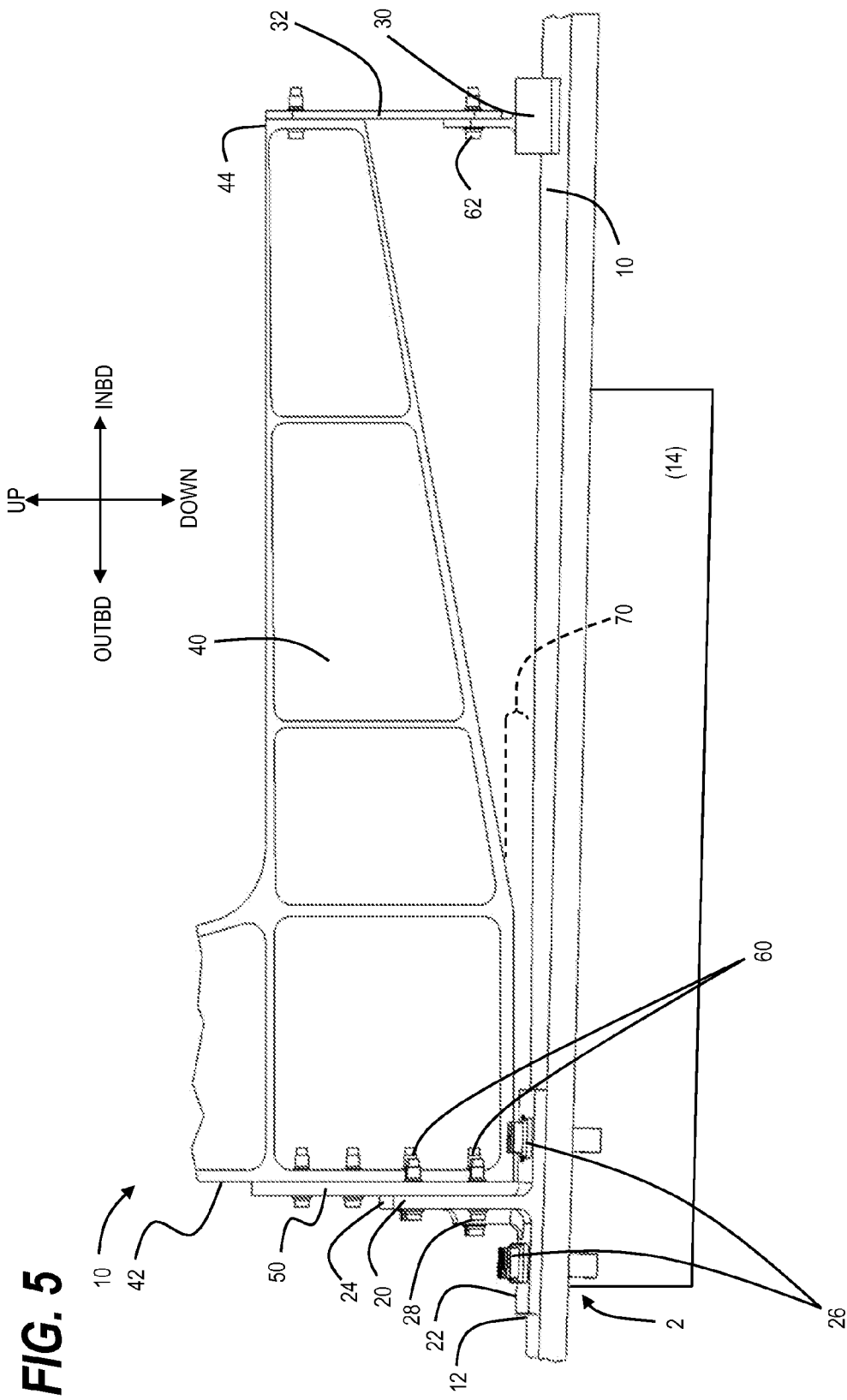
FIG. 5 is an enlarged, rearward viewing, partially cutaway front view illustrating the wing member and the pair of attachment rail members being joined to a body frame member.

FIG. 4 is an enlarged, rearward outboard viewing, partially cutaway isometric view, and FIG. 5, an enlarged, rearward viewing, partially cutaway front view, illustrate the wing assembly 2 and the pair of attachment members (20, 30) being joined to the aircraft body frame member 40. As shown in both of these Figures, a gap or a non-zero distance 70 separates a lower portion the aircraft body frame member 40 from the top surface of the outer wing skin 12 such that the aircraft body frame member 40 is suspended over the top surface of the wing assembly 2. As described above, since the aircraft body frame member 40 is attached to the attachment rail member 20 and the strap attachment fitting 30 via fasteners that do not penetrate the outer surface of the outer wing skin 12, the integrity of the interior cavity structure 14 within the wing assembly 2 is maintained upon attachment of the wing assembly 2 and body 3.

Figure 6:
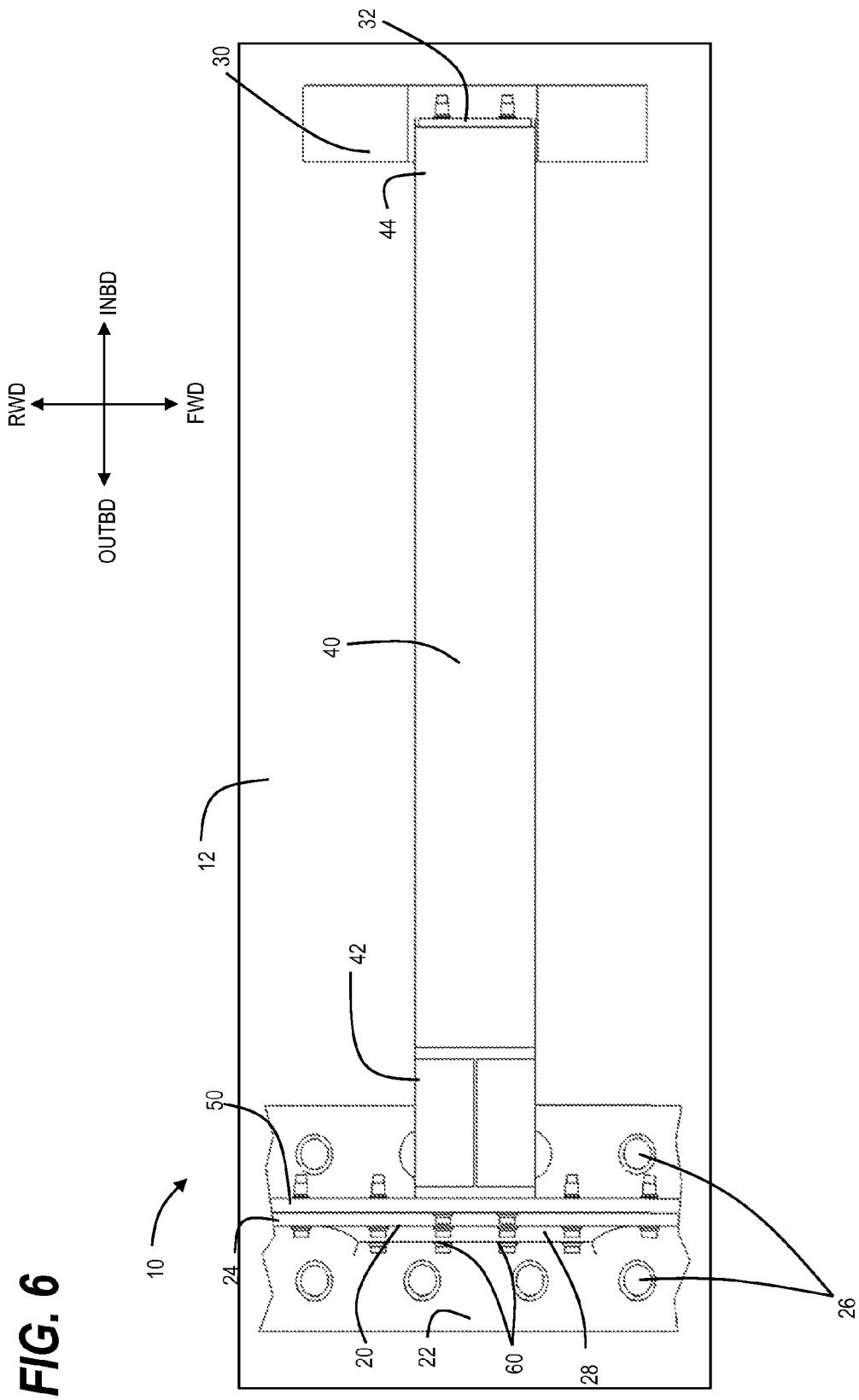
FIG. 6 is an enlarged, partially cutaway top view illustrating the wing member and the pair of attachment rail members being joined to a body frame member.

FIG. 6 is an enlarged, partially cutaway top view illustrating the outer wing skin 12 and the pair of attachment rail 20 and strap attachment fitting 30 being joined to a body frame member 40. FIG. 6 more clearly illustrates the outboard projection 28 extending in an outboard direction from the vertical surface of the vertical portion 24 of the attachment rail 20.

Figure 7:
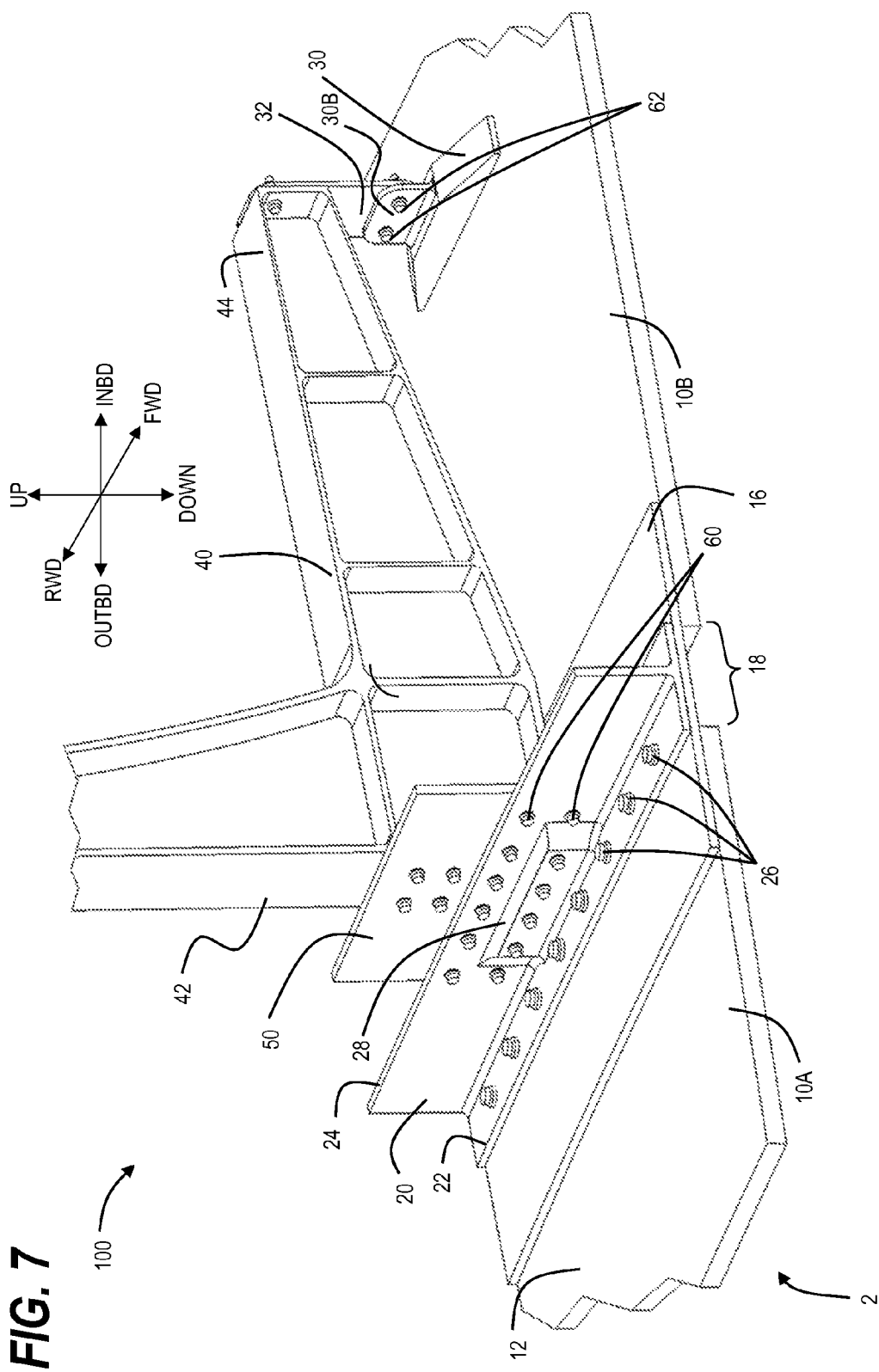
FIG. 7 is an enlarged, rearward inboard viewing, partially cutaway isometric view illustrating an alternative embodiment where a wing member includes multiple sections being joined together with a wing splice plate and the pair of attachment rail members being joined to a body frame member.

FIG. 7 is an enlarged, rearward inboard viewing, partially cutaway isometric view illustrating an alternative embodiment where a wing assembly 2 includes multiple sections 10A, 10B, being joined together with a wing splice plate 16 and the pair of attachment members (20, 30) being joined to a body frame member 40. Similar to the embodiment of FIG. 1, FIG. 7 illustrates that the wing assembly may include multiple sections 10A, 10B of an upper wing assembly portion 10. As such, a gap or a non-zero distance 18 may be disposed between these multiple wing sections 10A and 10B, where the wing splice plate 16 may be disposed over portions of the wing sections 10A and 10B proximate the gap or a non-zero distance 18 to join these wing sections together. Likewise, the attachment rail 20 may be attached with vertically oriented fasteners 26 to the top surface of the wing splice plate 16 in a similar manner to the embodiment disclosed in FIGS. 2-6.

Figure 8:
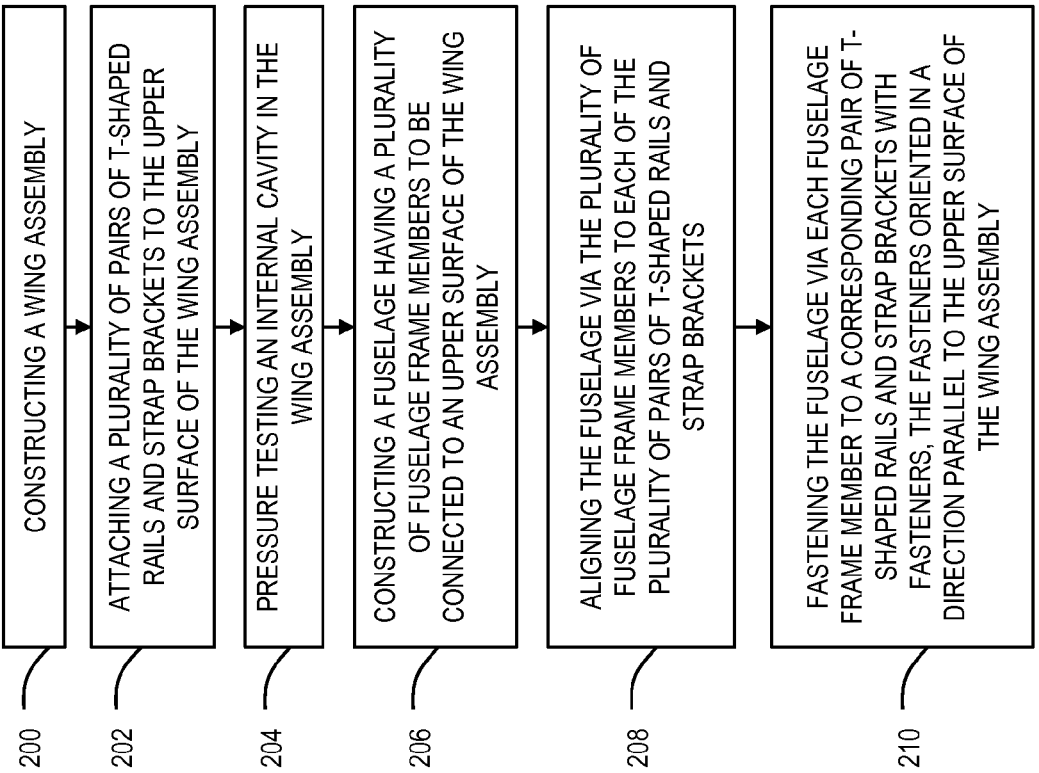
FIG. 8 is a logical flowchart process illustrating a method of attaching a wing assembly to an aircraft body.

FIG. 8 is a logical flowchart process illustrating a method of attaching a wing assembly to an aircraft body that starts with constructing a wing assembly 200 and attaching a number of pairs of rails and strap brackets to the upper surface of the wing assembly 202. An internal cavity in the wing assembly is then pressure tested 204 to determine its structural integrity. An aircraft body is constructed having a number of body frame members to be connected to an upper surface of the wing assembly 206. The aircraft body is aligned via the number of body frame members to each of the number of pairs of rails and strap brackets 208, and then the aircraft body is fastened via each body frame member to a corresponding pair of rails and strap brackets with fasteners, where the fasteners are oriented in a direction parallel to the upper surface of the wing assembly 210. Additionally, the aircraft body skin may be fastened at each body frame member to a corresponding pair of rails and strap brackets with fasteners, where the fasteners are oriented in a direction parallel to the upper surface of the wing assembly.

The wing assembly 2 carries the majority of the forces through the attachment rails 20 and the strap attachment fittings 30 to the aircraft body 3 via the body frame members 40. A first loading condition is present when the aircraft 1 is on the ground, having no lift component on the wing assembly 2, where the attachment members (20, 30) bear the weight of the aircraft body 3 and transfer it through the wing assembly 2 to main landing gears. Once the aircraft 1 takes off from the ground, a second loading condition is present where the attachment members (20, 30) transfer a lift load induced by the in-flight wing assembly 2 to the aircraft body 3 via the body frame members 40.

Figure 9:
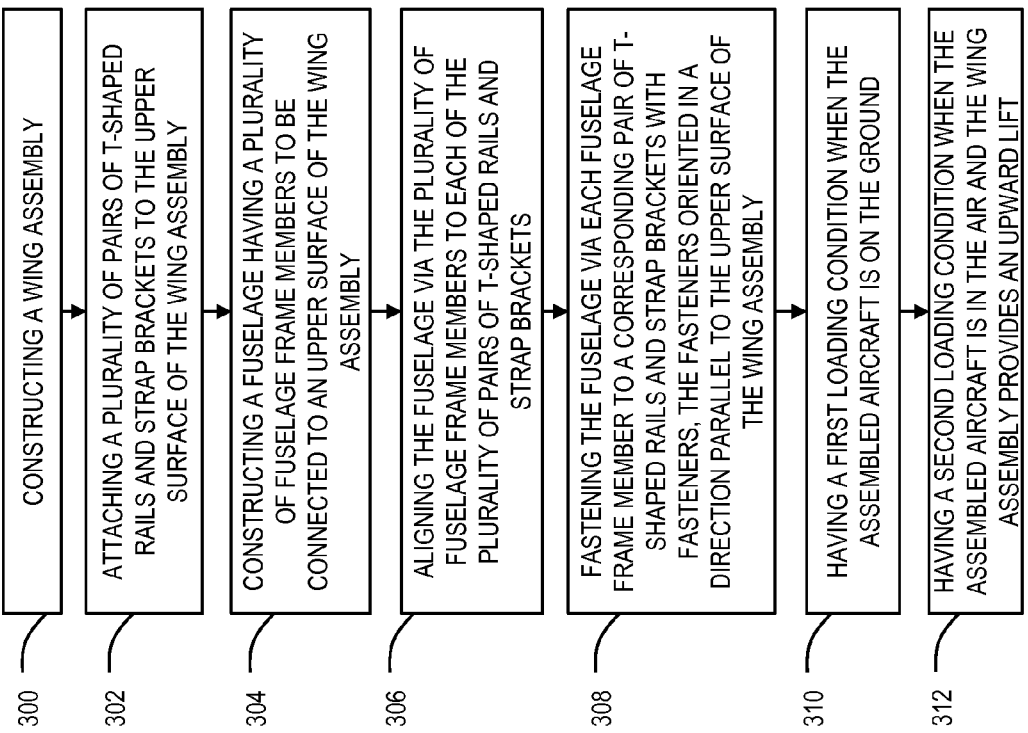
FIG. 9 is a logical flowchart process illustrating a method of loading an aircraft body in a grounded position and an airborne position.

FIG. 9 is a logical flowchart process illustrating a method of loading an aircraft body in a grounded position and an airborne position. The method is initiated by constructing a wing assembly 300 and attaching a number of pairs of rails and strap brackets to the upper surface of the wing assembly 302. An aircraft body is constructed having a number of body frame members 40 to be connected to an upper surface of the wing assembly 304. The aircraft body is aligned via the number of body frame members 40 to each of the number of pairs of rails and strap brackets 306, and then the aircraft body is fastened via each body frame member 40 to a corresponding pair of rails 20 and strap brackets 30 with fasteners, where the fasteners are oriented in a direction parallel to the upper surface of the wing assembly 308. Having a first loading condition 310 when the aircraft 1 is on the ground, with no lift component on the wing assembly 2, where the attachment members (20, 30) bear the weight of the aircraft body 3 and transfer it through the wing assembly 2 to main landing gears. Once the aircraft 1 takes off from the ground, a second loading condition 312 is present where the attachment members (20, 30) transfer a lift load induced by the in-flight wing assembly 2 to the aircraft body 3 via the body frame members 40.

The benefits of de-coupling the aircraft body 3 to wing box center section 2C interface allows both wing box stringers and the aircraft body stub beams (not shown) to be optimized for weight savings. It also allows the wing assembly 2, and in particular wing box center section 2C, to be completed, pressure tested and service ready as desired prior to joining with the aircraft body 3. Aircraft body frame members 40 may be fully installed to the outer body skin 50 in one piece instead of multiple frame members, which saves weight by eliminating a frame splice where body frame pieces are joined.

Additionally, any secondary fuel barrier application process on any external parts of the wing box fuel cell common to the body pressure boundary may be completed in a controlled environment after the wing assembly 2 is joined to the aircraft body 3 and will not be penetrated during the wing to body joining.

The embodiments disclosed herein allow the aircraft body frame connection to the upper wing box surface to be de-coupled from a common interface of a wing assembly with the wing fuel cell by only attaching the aircraft body frame members to the wing assembly wing box through vertical interfaces outside the wing box. This configuration allows the wing fuel cell to be completed prior to joining to the aircraft body. It also allows the aircraft body frames to be fully installed to the aircraft body skin in one piece prior to joining to the wing, thereby reducing weight and eliminating frame splicing of multiple frame parts. This configuration results in a weight savings and less manufacturing work at the wing to body join position by significantly reducing the difficult installation of body frame stub beams to the wing box.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method of assembling an aircraft, the method comprising:
   constructing a wing assembly;
   constructing an aircraft body having a plurality of body frame members to be connected to an upper surface of the wing assembly;
   attaching a plurality of pairs of rails and strap brackets to the upper surface of the wing assembly;
   aligning the aircraft body via the plurality of body frame members to the plurality of pairs of rails and strap brackets, where an outboard side of each of the plurality of body frame members being aligned to the rails, and an inboard side of each of the plurality of body frame members being aligned to the strap brackets; and
   fastening the aircraft body with fasteners via each of the plurality of body frame members at their outboard side and inboard side to a corresponding pair of rails and strap brackets, respectively, the fasteners oriented in a direction parallel to the upper surface of the wing assembly.

2. The method of claim 1, further comprising:
   pressure testing an internal cavity in the wing assembly
     after attaching the plurality of pairs of rails and strap brackets to the upper surface of the wing assembly and
     before fastening the aircraft body via the body frame member to a corresponding pair of rails and strap brackets.

3. The method of claim 1, wherein the fasteners are located a non-zero distance above the upper surface of the wing assembly.

4. The method of claim 1, wherein the attaching the plurality of pairs of rails to the upper surface of the wing assembly further comprises attaching at least one rail to a splice plate that adjoins two adjacent sections of wing skin of the wing assembly.

5. The method of claim 1, wherein the aircraft body further comprises an aircraft body skin on an outboard side of the plurality of body frame members.

6. The method of claim 5, further comprising:
   fastening the aircraft body skin at the plurality of body frame members to a corresponding pair of rails and strap brackets with fasteners, the fasteners oriented in a direction parallel to the upper surface of the wing assembly.

* * * * *